US008646830B2

(12) United States Patent
Hettinger et al.

(10) Patent No.: US 8,646,830 B2
(45) Date of Patent: Feb. 11, 2014

(54) VEHICLE AND ASSOCIATED ENERGY RESERVOIR SUPPORT

(75) Inventors: Joel Hettinger, Puteaux (FR); Thierry Fillion, Bazemont (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 13/637,387

(22) PCT Filed: Mar. 11, 2011

(86) PCT No.: PCT/FR2011/050499
§ 371 (c)(1),
(2), (4) Date: Nov. 13, 2012

(87) PCT Pub. No.: WO2011/121202
PCT Pub. Date: Oct. 6, 2011

(65) Prior Publication Data
US 2013/0043702 A1    Feb. 21, 2013

(30) Foreign Application Priority Data
Mar. 29, 2010 (FR) ...................... 10 52265

(51) Int. Cl.
*B62D 21/02*    (2006.01)
(52) U.S. Cl.
USPC ............ 296/187.12; 296/187.08; 296/193.07; 296/204
(58) Field of Classification Search
USPC ................. 296/187.08, 187.12, 193.07, 204, 296/203.01
See application file for complete search history.

(56) References Cited

U.S. PATENT DOCUMENTS

| 4,416,461 | A  | * | 11/1983 | Hayashi et al. ............... 280/834 |
| 4,723,810 | A  | * | 2/1988  | Kanemaru et al. ....... 296/203.02 |
| 5,195,780 | A  |   | 3/1993  | Inoue et al. |
| 5,380,042 | A  | * | 1/1995  | Hively et al. ................. 280/834 |
| 5,673,940 | A  | * | 10/1997 | Gaisford et al. .............. 280/834 |
| 7,073,824 | B2 | * | 7/2006  | Uhara et al. .................. 280/834 |
| 7,114,764 | B1 | * | 10/2006 | Barsoum et al. ......... 296/193.07 |
| 7,540,343 | B2 | * | 6/2009  | Nakashima et al. ......... 180/65.1 |
| 7,836,999 | B2 | * | 11/2010 | Kato ............................. 180/312 |
| 8,016,346 | B2 | * | 9/2011  | Mendoza et al. ........ 296/193.07 |
| 8,037,960 | B2 | * | 10/2011 | Kiya ............................. 180/68.5 |
| 8,459,399 | B2 | * | 6/2013  | Ohashi ......................... 180/312 |

(Continued)

FOREIGN PATENT DOCUMENTS

EP    0 435 197    7/1991
EP    2 133 259    12/2009

OTHER PUBLICATIONS

International Search Report Issued May 19, 2011 in PCT/FR11/50499 Filed Mar. 11, 2011.

(Continued)

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

A vehicle, or a vehicle with electrical or hybrid propulsion, including: an energy reservoir support situated under a floor of the vehicle, the energy reservoir support being fixed between lateral side rails of the vehicle; and a mechanism absorbing a lateral impact, which is mounted in a space situated under the floor of the vehicle between the external bodywork of the vehicle and an energy reservoir.

11 Claims, 3 Drawing Sheets

(56) References Cited

U.S. PATENT DOCUMENTS

| | | | |
|---|---|---|---|
| 2003/0047932 A1 | 3/2003 | Kawazu et al. | |
| 2006/0113131 A1* | 6/2006 | Kato et al. | 180/65.3 |
| 2007/0007060 A1* | 1/2007 | Ono et al. | 180/65.3 |
| 2008/0196957 A1* | 8/2008 | Koike et al. | 180/68.5 |
| 2009/0278385 A1* | 11/2009 | Mendoza et al. | 296/187.12 |
| 2009/0309349 A1 | 12/2009 | Yamanami et al. | |
| 2010/0026046 A1* | 2/2010 | Mendoza et al. | 296/187.08 |
| 2010/0187864 A1* | 7/2010 | Tsuchida | 296/193.07 |
| 2010/0213741 A1* | 8/2010 | Suzuki et al. | 296/193.07 |
| 2011/0068606 A1* | 3/2011 | Klimek et al. | 296/187.08 |
| 2012/0161429 A1* | 6/2012 | Rawlinson et al. | 280/801.1 |
| 2012/0161472 A1* | 6/2012 | Rawlinson et al. | 296/187.08 |
| 2013/0026786 A1* | 1/2013 | Saeki | 296/187.12 |
| 2013/0043702 A1* | 2/2013 | Hettinger et al. | 296/187.12 |
| 2013/0057025 A1* | 3/2013 | Cabo | 296/187.08 |
| 2013/0088044 A1* | 4/2013 | Charbonneau et al. | 296/187.12 |
| 2013/0088045 A1* | 4/2013 | Charbonneau et al. | 296/187.12 |

OTHER PUBLICATIONS

French Search Report issued Nov. 10, 2010 in FR 10 52265 Filed Mar. 29, 2010.

* cited by examiner

VEHICLE AND ASSOCIATED ENERGY RESERVOIR SUPPORT

BACKGROUND

The invention concerns vehicles comprising an energy reservoir with a system for dissipating energy, known as a "bumper", during an impact due to a collision between the vehicle and an external element. The vehicle can for example be an electric or hybrid propulsion vehicle.

More particularly, the invention concerns vehicles comprising an energy reservoir, such as batteries, or a gas or fuel tank situated below the vehicle floor.

Today, bumper systems are fitted as standard at the front and rear of vehicles in order to absorb the impact energy released by collisions between the vehicle and an external element, such that the supporting structure of the vehicle is damaged as little as possible.

A bumper system generally comprises a component such as an impact absorber, which converts the impact energy into a deformation force, and a crossmember able to transmit the energy resulting from the impact to the impact absorber. These bumper systems are designed such that the impact absorber is situated as centrally as possible on the front or rear beam, and such that the impact energy is transmitted to the impact absorber and consequently also to the front or rear beam.

Energy dissipation systems must be continually readapted to the different standards in force and to the different requirements linked to the design of new vehicles. In particular, when electric or hybrid vehicles appeared, battery protection standards were established in order to reduce the thermal and electric risks to the battery during an impact. The installation of batteries below the vehicle floor makes it necessary to design a system for dissipating energy during a side impact, in order to limit damage to the batteries.

BRIEF SUMMARY

The object of the invention is therefore to provide a vehicle comprising an energy reservoir situated below the vehicle floor, in particular an electric or hybrid propulsion vehicle, comprising a laterally optimized energy dissipation system in order to minimize the risks of damage to the energy reservoir situated below the vehicle floor.

In one embodiment, the invention concerns a vehicle comprising an energy reservoir support, for example a bank of batteries, situated below the vehicle floor. The energy reservoir support is fixed between the lateral side members of the vehicle. The side member is a part of the vehicle chassis arranged in the longitudinal direction of the vehicle. The vehicle has under or on its floor two side members which are symmetrical in relation to the axis of symmetry of the vehicle.

The vehicle comprises means for absorbing a side impact which are able to be inserted into a space situated below the vehicle floor between the outer bodywork of the vehicle and the energy reservoir such as batteries. The impact absorption means take the form of deformable structure that allow the impact energy to be dissipated. The outer bodywork of the vehicle is generally called the lower body of the vehicle.

Advantageously, the impact absorption means comprise a main lateral absorber and a lateral plate which are situated on either side of the energy reservoir support.

For example, each lateral plate is fixed to the energy reservoir support, and the main lateral absorber is situated between each side member and the energy reservoir support.

The impact absorption means can comprise at least one secondary lateral absorber situated between the outer bodywork of the vehicle and the main lateral absorber.

Advantageously, the secondary absorber is fixed to each of the lateral plates.

The vehicle comprises means for stiffening the energy reservoir support. These stiffening means comprise at least one horizontal crossmember able to be fixed to each of the main lateral absorbers.

In addition, the lateral plate is able to be fixed to one of the side members and comprises a stamped metal sheet.

The main and secondary lateral absorbers can be made of synthetic or metallic material and can have a structure capable of dissipating energy in the event of an impact, for example a cellular structure.

According to a second aspect, the invention concerns an energy reservoir support able to be fixed below the vehicle floor.

The energy reservoir support comprises means for absorbing a side impact comprising a lateral plate and a main lateral absorber.

Advantageously the absorption means are mounted in the space situated below the vehicle floor between the outer bodywork of the vehicle and the energy reservoir.

BREIF DESCRIPTION OF THE DRAWINGS

Further aims, characteristics and advantages of the invention will become apparent from reading the following description given purely by way of non-limiting example, and with reference to the attached drawings, in which.

DETAIL DESCRIPTION

Figure 1:
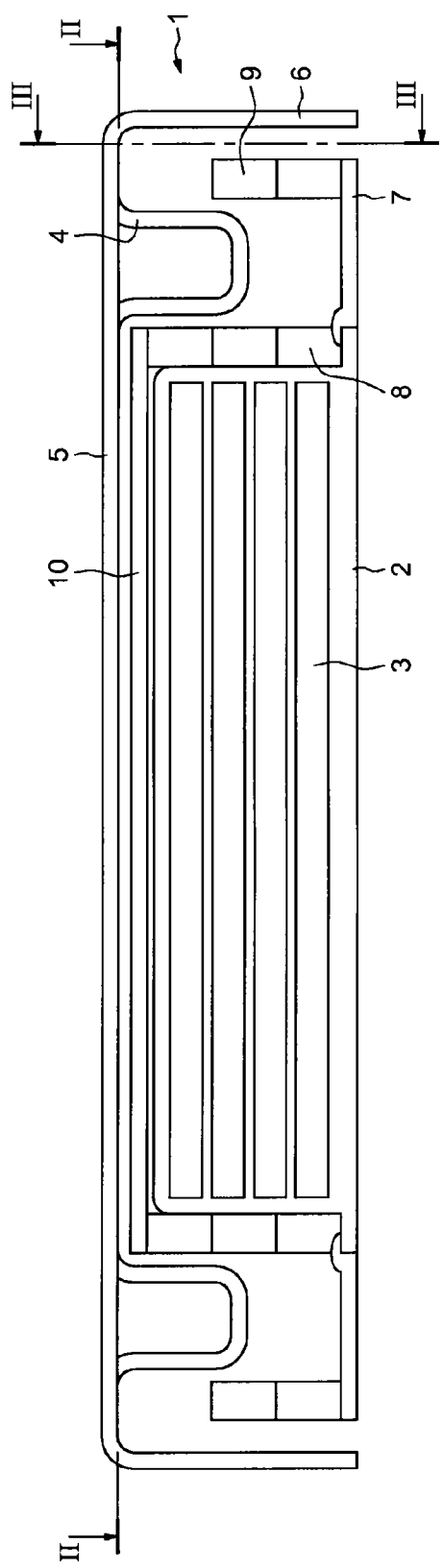
FIG. 1 shows a vehicle according to the invention in cross section.

The vehicle 1 shown in FIG. 1 is for example an electric or hybrid vehicle. The chassis of the vehicle 1 comprises a support 2 for an energy reservoir 3 which, in the example shown, is a bank of electric batteries. The support 2 is fixed to lateral side members 4 by means for example of bolts (not shown). The lateral side members 4 correspond to a part of the vehicle chassis arranged in the longitudinal direction of the vehicle. The support 2 is situated below the floor 5 of the vehicle 1.

The vehicle 1 comprises means for absorbing the energy of a side impact. These absorption means are inserted into an available space between the batteries 3 and the bodywork 6 of a vehicle.

The impact absorption means comprise a lateral plate 7 situated on either side of the support 2. The lateral plates 7 can for example be fixed by welding to the support 2. These lateral plates 7 can be made of extruded metal plate, for example of aluminum or steel, in order to improve the energy absorption. They are situated below the lateral side members 4. The lateral plates 7 can for example be fixed to the vehicle structure via screw connections or by any other system allowing rapid removal and refitting.

In addition, the impact absorption means comprise a main lateral absorber 8 situated on either side of the support 2. Each main lateral absorber 8 is situated between each side member 4 and the support 2.

In the example illustrated, the impact absorption means also comprise two secondary lateral absorbers 9 situated on each of the lateral plates 7. The secondary lateral absorbers 9 are situated between the outer bodywork 6 of the vehicle and the main lateral absorber 8. More precisely, they can be situated between the outer bodywork 6 and each of the side members 4. However, these lateral absorbers 9 can be placed at different locations depending on the vehicle and the available space between the support 2 and the outer bodywork 6 of the vehicle. There can be fewer or more than two of the secondary lateral absorbers 9, depending on need.

The main lateral absorbers 8 and secondary lateral absorbers 9 can for example be made of metallic material such as steel or extruded aluminum, or of synthetic material such as polypropylene (PP), and can have a structure capable of dissipating energy in the event of an impact, such as a cellular structure (honeycomb type for example), wherein the cells are oriented in a direction perpendicular to the side members 4. The dimensions of the absorbers 8 and 9 depend on the length of the support 2 and the height between the ground and the floor 5 of the vehicle 1.

The vehicle 1 can comprise stiffening means, comprising crossmembers 10. These crossmembers 10 are fixed to each of the main lateral absorbers 8 by screws or by any other means.

Figure 2:
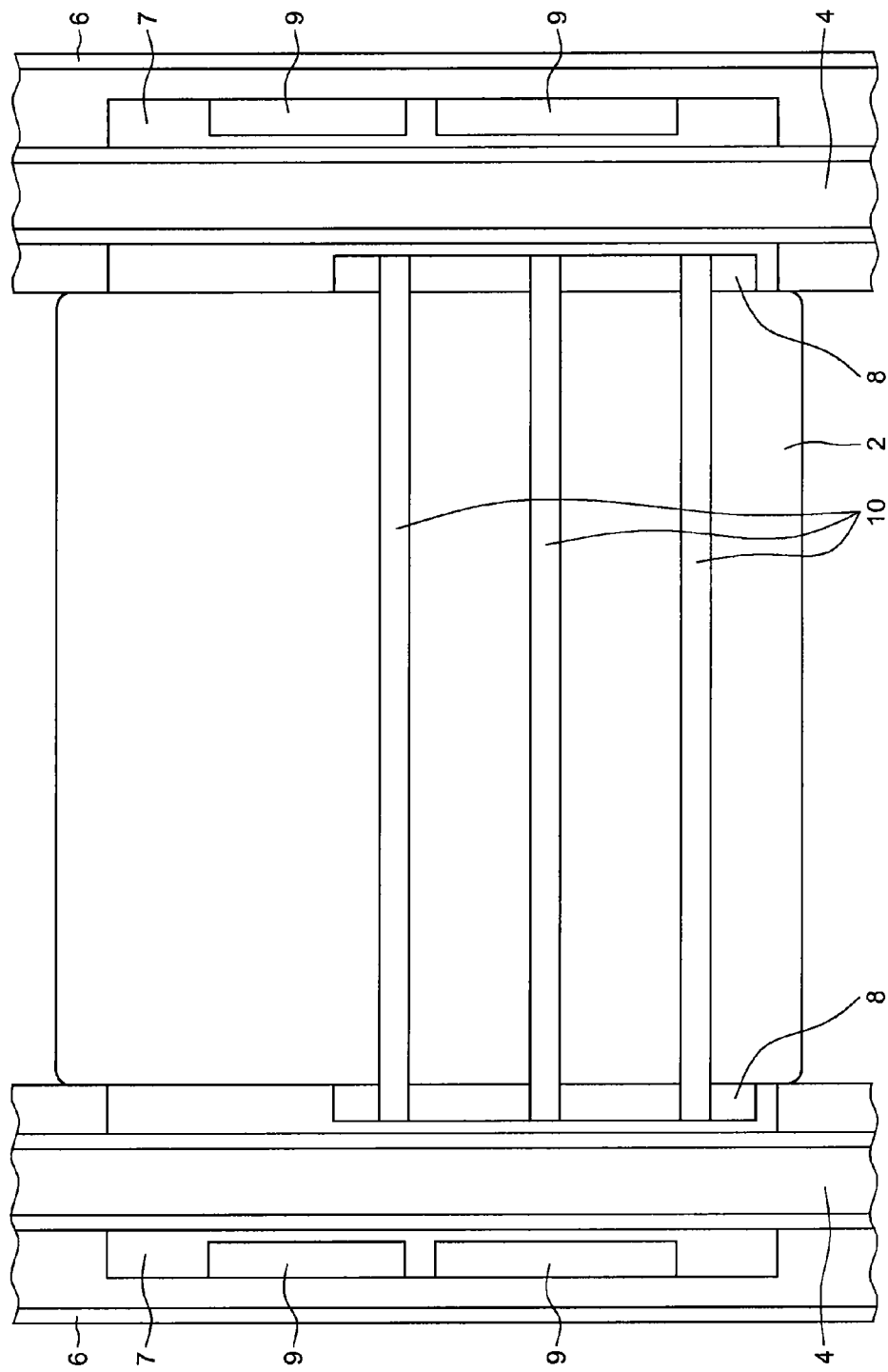
FIG. 2 shows a top view along the section line II-II.

FIG. 2 shows a top view of the vehicle 1 along the section line II-II in FIG. 1. By way of non-limiting example, there are three crossmembers 10. The number of crossmembers 10 can vary depending on their thickness and the need to stiffen the support 2.

Figure 3:
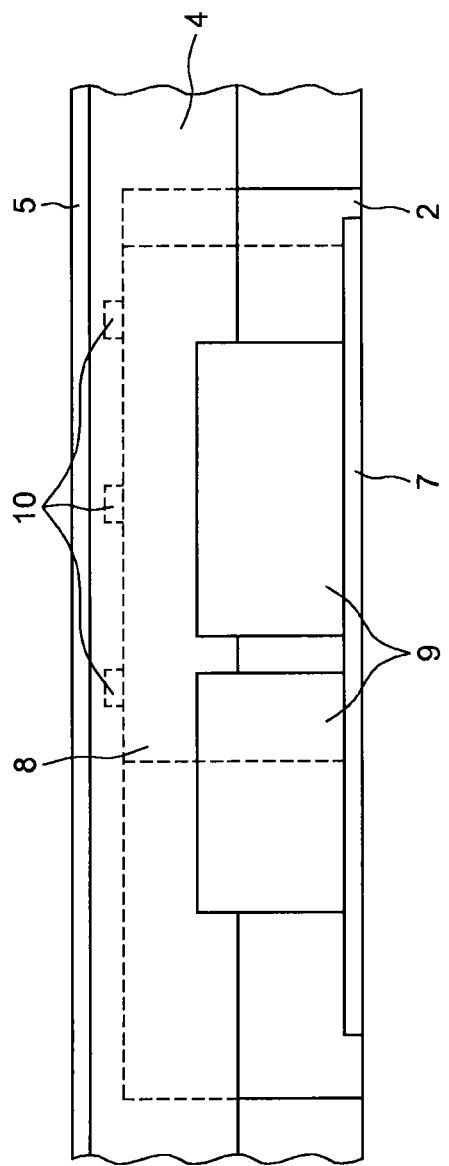
FIG. 3 shows a side view along the section line III-III.

FIG. 3 shows a side view of the vehicle 1 along the section line III-III in FIG. 1.

The energy dissipation system is mounted on the support 2 outside the vehicle 1, then the support 2 is fixed to the side members 4 so as to position the impact absorption means 7, 8 and 9 in the available spaces below the floor 5 of the vehicle 1.

The position and dimensions of the impact absorption means can be adapted to each vehicle.

Thus, in a second embodiment, the absorber 9 could be fixed not to the lateral plate 7, which is secured to the support, but instead to a structural element of the vehicle such as a lower body or the crossmember 4 for example. It would also be possible to fix the absorber 8 to the crossmember 4. Such an embodiment has the advantage of reducing the space required for the energy reservoir and in particular the battery in a transverse direction.

By virtue of the invention just described, the vehicle energy reservoir and more particularly, in the case of an electric or hybrid vehicle, the battery or batteries contained in a battery support are protected during a lateral collision of the vehicle. During the collision, the impact energy is transmitted to the energy absorption means and the stiffening means. The latter are then compressed by the impact energy so as to protect the energy reservoir and prevent the risk of deterioration which could prove dangerous.

The embodiment just described and illustrated in the figures concerns a vehicle equipped with batteries mounted below the floor. The invention could be applied without major modification to other types of energy source situated below the floor, such as gas or fuel tanks.

The invention claimed is:

1. A vehicle, comprising:
    an energy reservoir support situated below a vehicle floor, the energy reservoir support being fixed between lateral side members of the vehicle; and
    means for absorbing a side impact that is mounted in a space situated below the vehicle floor between outer bodywork of the vehicle and an energy reservoir, the impact absorption means including a lateral plate extending laterally from the energy reservoir support, a main lateral absorber positioned between the energy reservoir support and one of the lateral side members of the vehicle, and a secondary lateral absorber positioned outside of the lateral side members of the vehicle.

2. The vehicle as claimed in claim 1, wherein the lateral plate is fixed to the energy reservoir support.

3. The vehicle as claimed in claim 1, wherein the secondary lateral absorber is fixed to the lateral plate.

4. The vehicle as claimed in claim 1, further comprising at least one horizontal crossmember fixed by its end to the main lateral absorber.

5. The vehicle as claimed in claim 1, wherein the lateral plate is fixed to one of the side members.

6. The vehicle as claimed in claim 1, wherein the lateral plate comprises a stamped metal sheet, and the main and secondary lateral absorbers are made of a synthetic or metallic material and have a structure configured to dissipate energy in event of an impact.

7. The vehicle as claimed in claim 1, wherein the energy reservoir includes electric batteries.

8. The vehicle as claimed in claim 1, wherein the main and secondary lateral absorbers have a cellular structure arranged in a honeycomb.

9. The vehicle as claimed in claim 1, wherein the main and secondary lateral absorbers are spaced apart from the side members.

10. The vehicle as claimed in claim 1, wherein the main and secondary lateral absorbers are vertically above the lateral plate.

11. An energy reservoir support for a vehicle, configured to be fixed below a vehicle floor, comprising:
    means for absorbing a side impact comprising a lateral plate, a main lateral absorber that is mounted in a space situated below the vehicle floor between a lateral side member of the vehicle and an energy reservoir, and a secondary lateral absorber mounted between outer bodywork of the vehicle and the energy reservoir.

* * * * *